United States Patent [19]
Imura et al.

[11] Patent Number: 5,526,192
[45] Date of Patent: Jun. 11, 1996

[54] VIBRATION PREVENTION DEVICE FOR AN OPTICAL SYSTEM

[75] Inventors: Yoshio Imura, Kawasaki; Yoshihisa Kitagawa, Kashiwa, both of Japan

[73] Assignee: Nikon Corporation, Tokyo, Japan

[21] Appl. No.: 220,039

[22] Filed: Mar. 30, 1994

[30] Foreign Application Priority Data

Mar. 30, 1993 [JP] Japan .................................. 5-095204

[51] Int. Cl.⁶ ...................................................... G02B 7/02
[52] U.S. Cl. ............................ 359/813; 359/819; 359/554
[58] Field of Search .................................. 359/813, 814, 359/694, 695, 696, 554, 557; 354/446, 430

[56] References Cited

U.S. PATENT DOCUMENTS

| | | | |
|---|---|---|---|
| 3,620,603 | 11/1971 | White | 359/813 |
| 4,387,970 | 6/1983 | Brueggemann | 359/813 |
| 5,172,276 | 12/1992 | Ueyama et al. | 359/813 |
| 5,416,558 | 5/1995 | Katayama et al. | 354/446 |

FOREIGN PATENT DOCUMENTS

| | | | |
|---|---|---|---|
| 177815 | 4/1986 | European Pat. Off. | 359/813 |
| 3-110530 | 5/1991 | Japan . | |

*Primary Examiner*—Loha Ben

[57] ABSTRACT

A vibration-preventing device for a main optical system which prevents the occurrence of image shake due to vibration. A vibration-preventing optical system is held by a lens frame and moves in a direction at a right angle with respect to an optical axis of the main optical system to prevent the occurrence of image shake due to vibration. Moving members are joined to the lens frame and are driven in a direction which is at a right angle with respect to the optical axis. A guide determines a direction in which the moving members are driven and an energization device is attached to the lens frame and energizes the lens frame to contact the moving members.

28 Claims, 7 Drawing Sheets

VIBRATION PREVENTION DEVICE FOR AN OPTICAL SYSTEM

BACKGROUND OF THE INVENTION

1. Field of the Invention

The present invention relates to a vibration-preventing device for an optical system which prevents image vibration resulting from vibration of the optical system, and, more particularly, to a vibration-preventing lens drive mechanism which prevents image vibration in a camera.

2. Description of the Related Art

Cameras having vibration-preventing devices are known which prevent an image from shaking due to vibration of the camera during picture taking. To prevent the image from shaking, the known devices move a vibration-preventing lens which is a part of a picture-taking lens in a direction perpendicular to the optical axis of the picture-taking lens. The above-described types of vibration-preventing devices require that the vibration-preventing lens be driven at a high speed and with high accuracy in a direction perpendicular to the optical axis of the picture-taking lens. To drive the vibration-preventing lens at high speed and with high accuracy, the following problems must be solved:

(1) The vibration-preventing lens must be guided in a low-load condition since it is driven at high speed.

(2) There must be no play between a drive and the vibration-preventing lens to reliably prevent image vibration.

(3) There must be no play in a guide section of the vibration-preventing lens. If there is play in the guide section, the vibration-preventing lens will topple and the lens will not be able to maintain the performance of the picture-taking lens, much less prevent shake.

The above-described type of vibration-preventing device may include, for example, a drive mechanism for moving the vibration-preventing lens having a configuration such as that disclosed in Japanese Patent Publication Number 3-110530. However, the drive mechanism disclosed in Japanese Patent Publication Number 3-110530 includes a guide section for the vibration-preventing lens and a section connecting the vibration-preventing lens and a drive which have a complex and costly structure.

It is therefore desirable to have a camera including a vibration-preventing device with a vibration-preventing lens drive mechanism which prevents image shake with high accuracy and has a simple, low-cost structure.

SUMMARY OF THE INVENTION

It is an object of the present invention to provide a vibration-preventing device for an optical system which has a vibration-preventing drive mechanism which prevents image shake with high accuracy, It is a further object of the present invention to provide a vibration-preventing device for an optical system which has a vibration-preventing drive mechanism which prevents image shake and has a simple, low-cost structure, It is another object of the present invention to provide a vibration-preventing device for an optical system having a vibration-preventing drive mechanism which drives a vibration-preventing optical system at high speed and guides the vibration-preventing optical system in a low-load condition, It is another object of the present invention to provide a vibration-preventing device for an optical system having a vibration-preventing drive mechanism which drives a vibration-preventing optical system such that there is no play between the vibration-preventing optical system and a drive.

It is another object of the present invention to provide a vibration-preventing device for an optical system having a vibration-preventing drive mechanism which drives a vibration-preventing optical system and which includes a guide section with minimal play in the guide section.

Additional objects and advantages of the invention will be set forth in the description which follows, and, in part, will be obvious from the description, or may be learned by practice of the invention.

The foregoing objects of the present invention are achieved by providing a vibration-preventing device for an optical system including a vibration-preventing optical system. The vibration-preventing optical system is movable in a direction at a right angle with respect to an optical axis of a main optical system to prevent an image from shaking due to vibration.

In accordance with a first embodiment of the present invention, the vibration-preventing device includes a lens frame which holds the vibration-preventing optical system. Moving members are joined to the lens frame and are moved by respective drives in a direction which is approximately at a right angle with respect to the optical axis of the main optical system. A guide determines a direction of motion of the moving members, and an energization device, which may comprise a spring, energizes the lens frame to contact the moving members. The energization device may energize the lens frame in a direction which is approximately the same as the direction of motion of the moving members. The vibration-preventing device may also include rollers and joining sections which allows the lens frame to be moved in a direction other than the direction of motion of the moving members.

In accordance with a second embodiment of the present invention, the vibration-preventing device includes a lens frame which holds the vibration-preventing optical system, and a guide which includes a spherical member to smoothly move the lens frame in a plane which is at a right angle with respect to the optical axis of the main optical system. An energization device, which may comprise a spring, energizes the lens frame in the direction of the optical axis so that it is always in connection with the guide. The guide may comprise multiple spherical members which are positioned on a plane which is at a right angle with respect to the optical axis. A positioning device determines a position of a spherical member such that the spherical member maintains its position but is freely supported so that the spherical member may rotate. The positioning device may be approximately cylindrical, including a lower section having planar holes, whereby the position of the spherical members is determined by the planar holes. The lower section of the positioning device comprises a material with low-friction characteristics.

The present invention enables the lens frame which holds the vibration-preventing optical system to move so that by the action of an energization device the lens frame always follows the moving members. Moreover, the lens frame which holds the vibration-preventing optical system is energized by an energization device and guided by the guide device so that it can smoothly move in a plane which is at a right angle with respect to the direction of the optical axis, and is guided in a condition in which it is always in connection with the guide device.

BRIEF DESCRIPTION OF THE DRAWINGS

These and other objects and advantages of the present invention will become apparent and more readily appreciated from the following description of the preferred embodiments taken in conjunction with the accompanying drawings of which.

DESCRIPTION OF THE PREFERRED EMBODIMENTS

Figure 1:
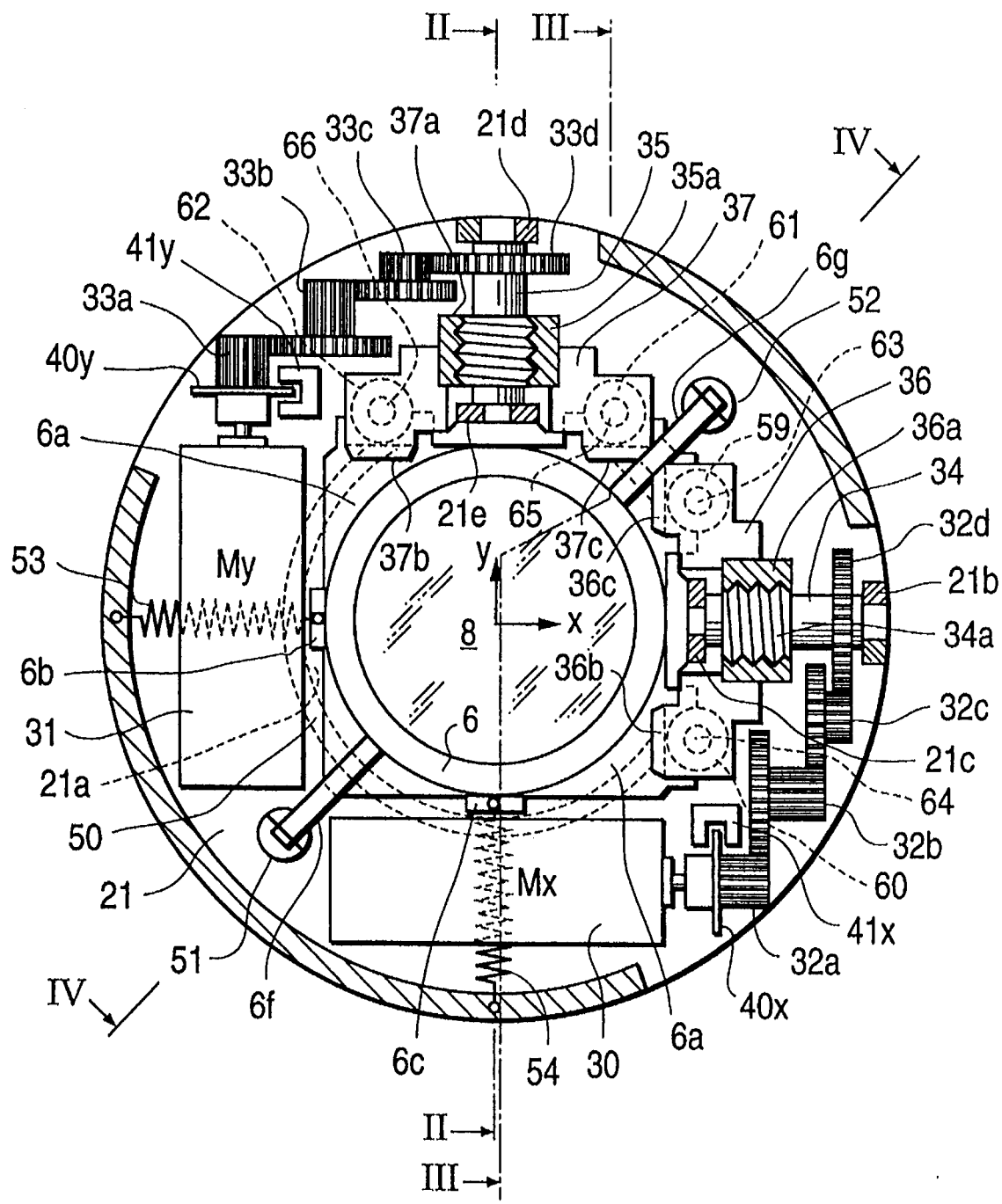
FIG. 1 is a cross-sectional diagram of a vibration-preventing device for an optical system in accordance with a first embodiment of the present invention.

Reference will now be made in detail to the preferred embodiments of the present invention, examples of which are illustrated in the accompanying drawings, wherein like reference numerals refer to the same or similar elements throughout.

Figure 4:
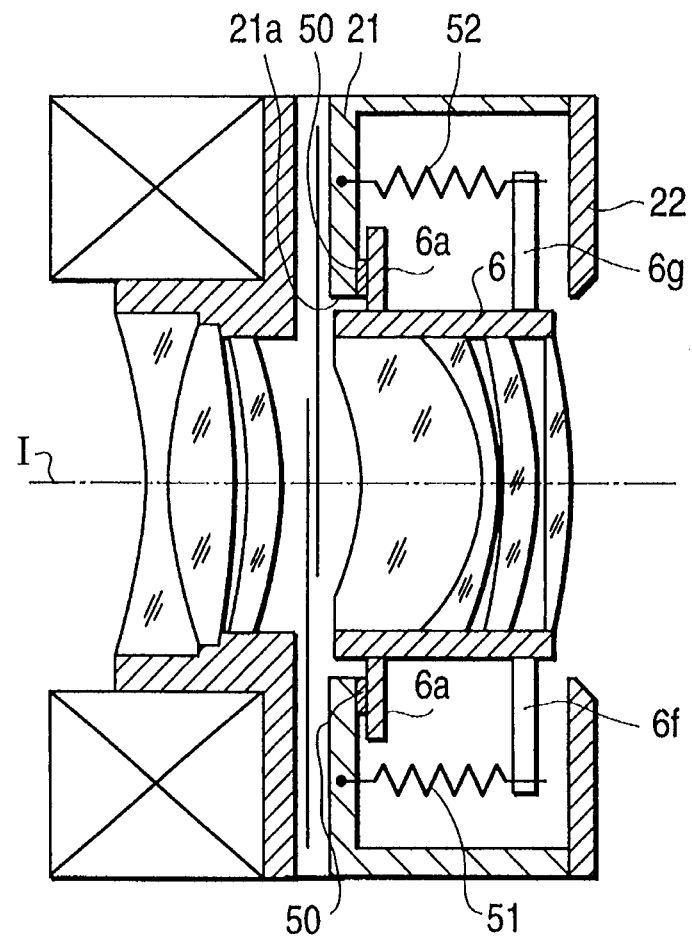
FIG. 4 is a cross-sectional diagram of the vibration-preventing device of FIG. 1 taken along the IV—IV line in FIG. 1 in accordance with the first embodiment of the present invention.
Figure 5:
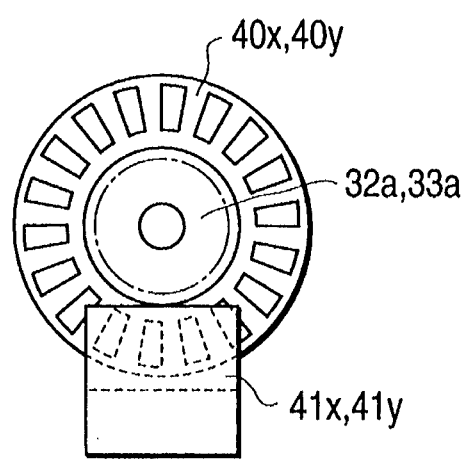
FIG. 5 is a schematic diagram showing a position detecting device for the vibration-preventing lens in accordance with the first embodiment of the present invention.
Figure 6:
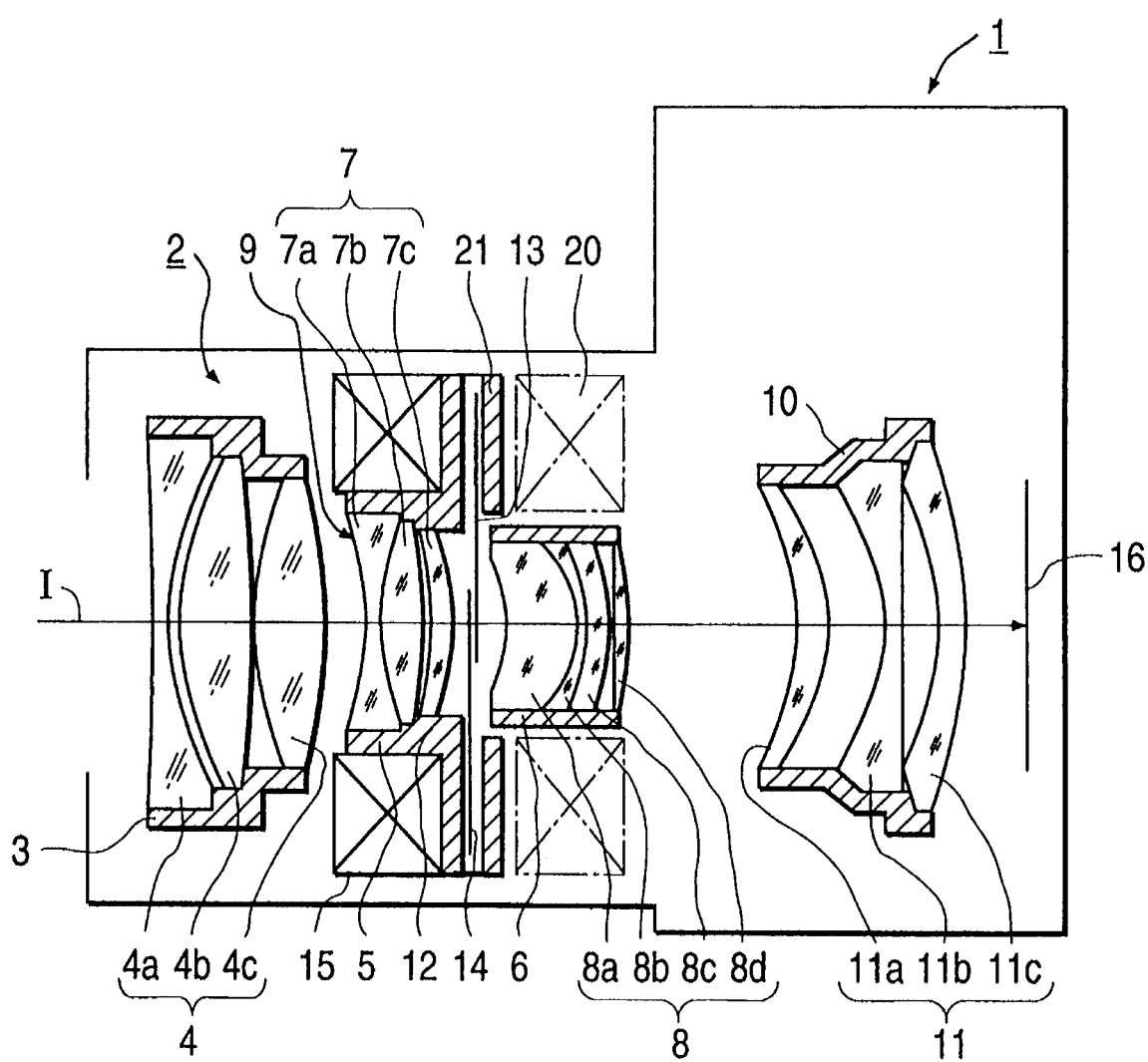
FIG. 6 is a schematic diagram showing a camera including a lens shutter with which the vibration-preventing device of the present invention may be used.

FIGS. 1 through 6 show a vibration-preventing device for an optical system in accordance with a first embodiment of the present invention. The vibration-preventing device according to the present invention prevents an image formed on an image forming plane from shaking due to vibration in an optical system. The vibration-preventing device may be used, for example, in a camera 1 having a configuration as shown in FIG. 6, which includes a picture-taking lens system 2 having a lens shutter 12.

As seen in FIG. 6, the camera 1 includes a picture-taking lens system 2 configured as a zoom lens. The picture-taking lens system 2 has an optical axis I and includes a first lens group 4, a second lens group 9, and a third lens group 11. The first lens group 4 includes three lenses 4a, 4b, 4c which are held by a lens frame 3. The second lens group 9 includes a total of seven lenses: three in a front lens group 7, and four in a rear lens group 8. The three lenses of the front lens group 7a, 7b, 7c are held by a lens frame 5, and the four lenses of the rear lens group 8a, 8b, 8c, 8d are held by a lens frame 6. The third lens group 11 is configured as a zoom lens which includes three lenses 11a, 11b, 11c held by a lens frame 10.

The lens shutter 12 is positioned between the front and rear lens groups 7, 8 of the second lens group 9. The lens shutter 12 includes shutter blinds 13, 14 and a driver 15 which drives the shutter blinds 13, 14. The driver 15 is positioned, for example, at a perimeter section of the lens frame 5 of the front lens group 7, and the shutter blinds 13, 14 are positioned just before the rear lens group 8. An image-forming plane 16 is positioned to form on a film or other storage media an image of a subject produced by the first, second and third lens groups 4, 9, 11, respectively, which make up the picture-taking lens system 2.

In accordance with the first embodiment of the present invention, the rear lens group 8 (hereinafter referred to as the vibration-preventing optical system) may be shifted in a direction which is at a right angle with respect to the optical axis I by a vibration-preventing mechanism 20 (FIG. 6). By shifting the vibration-preventing optical system 8, an image which is formed on the image-forming plane 16 is moved according to an image-vibration condition. The vibration-preventing mechanism 20 is positioned at the perimeter space of the vibration-preventing optical system 8 adjacent to a base 21 with a base housing panel member 22, as shown generally in FIG. 6 and in more detail in FIGS. 2, 3 and 4.

The vibration-preventing mechanism 20 in accordance with the first embodiment of the present invention will now be described in detail with reference to FIGS. 1 through 4. The vibration-preventing optical system 8 is held and secured inside the lens frame 6, and the lens frame 6 includes a flange 6a which contacts the base 21 through a gliding member 50 (FIG. 4). The lens frame 6 also includes arms 6f, 6g which are attached to and extend from the lens frame 6, and are connected to the base 21 by springs 51, 52. The vibration-preventing optical system 8 is thereby secured around an opening 21a in the base 21 by the gliding member 50 and springs 51, 52.

The gliding member 50 comprises materials with low-friction characteristics such as teflon, fluororesin, and phosphor bronze, or may be constructed of a member which has undergone surface treatment to acquire low-friction characteristics. Because of the low-friction characteristics of the gliding member 50, the vibration-preventing optical system 8 can move under a low load in a plane which is perpendicular to the optical axis I, and, moreover, the vibration-preventing optical system 8 is energized by springs 51, 52 so that there is no toppling which would lead to deterioration in optical performance.

As seen in FIG. 1. DC motors 30, 31 drive the vibration-preventing optical system 8, moving the vibration-preventing optical system 8 in an x-axis direction and a y-axis direction, respectively. (In FIG. 1, DC motor 30 is also referenced as Mx, and DC motor 31 is also referenced as My). Gear trains 32, 33 are rotating and transmitting gear trains which transmit the driving force of motors 30 and 31, respectively. Gear train 32 includes gears 32a, 32b, 32c and 32d and transmits the driving force of motor 30 to a first shaft 34. Gear train 33 includes gears 33a, 33b, 33c and 33d and transmits the driving force of motor 31 to a second shaft 35. The first shaft 34 is supported by beatings 21b and 21c, and the second shaft 35 is supported by bearings 21d and 21e. The beatings 21b, 21c, 21d, 21e are attached to the base 21 so that the first and second shafts 34, 35 are able to rotate along the y-axis and x-axis direction, respectively.

The motors 30, 31 are secured to the side of the base 21. The gears 32a, 32b, 32c and 33a, 33b, 33c of the gear trains 32, 33, respectively, are secured to the base 21 so that they are able to rotate, and the gears 32d, 33d are configured so that they rotate in unison with the respective shafts 34, 35.

Figure 2:
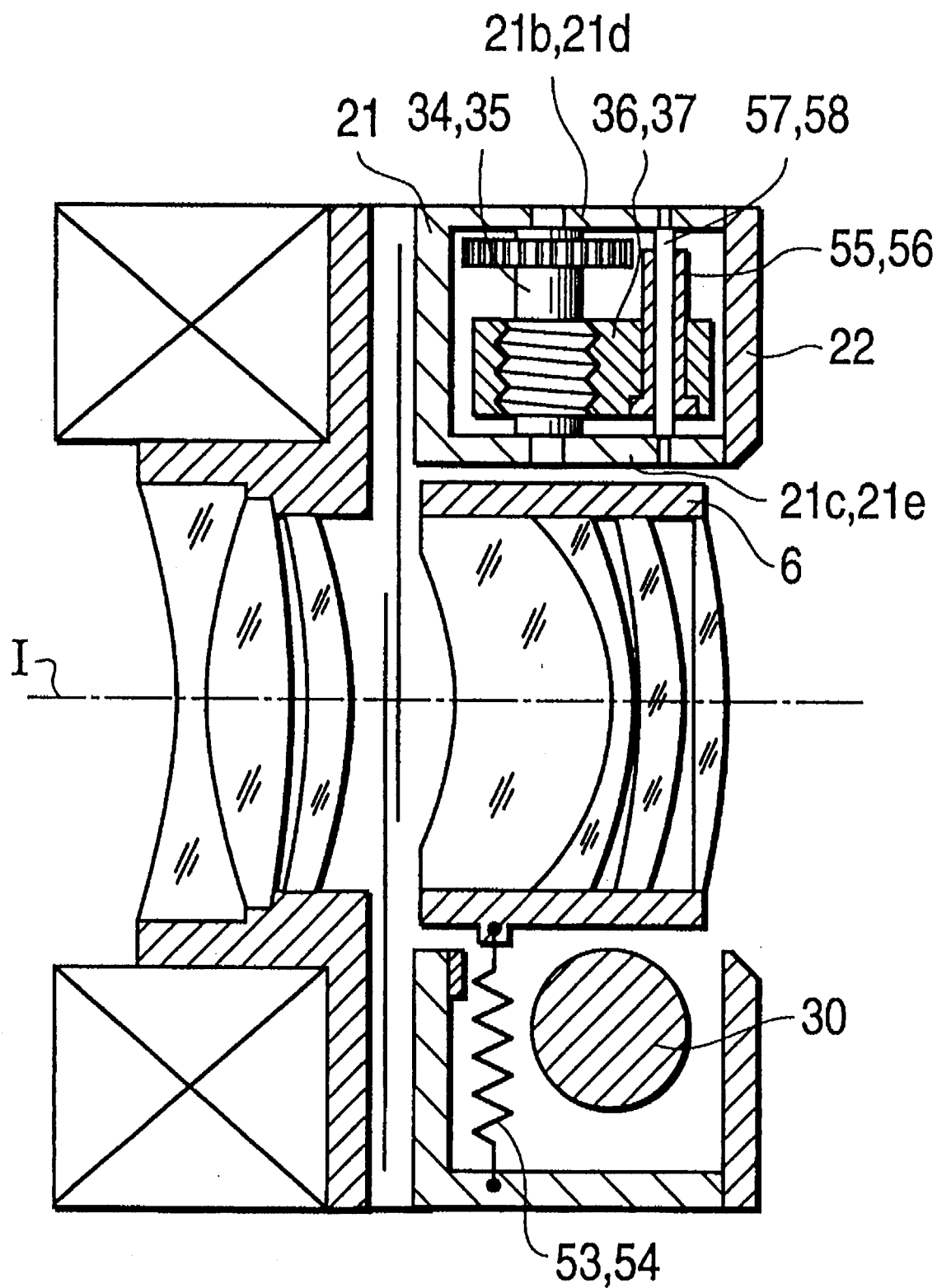
FIG. 2 is a cross-sectional diagram of the vibration-preventing device of FIG. 1 taken along the II—II line in FIG. 1 in accordance with the first embodiment of the present invention.
Figure 3:
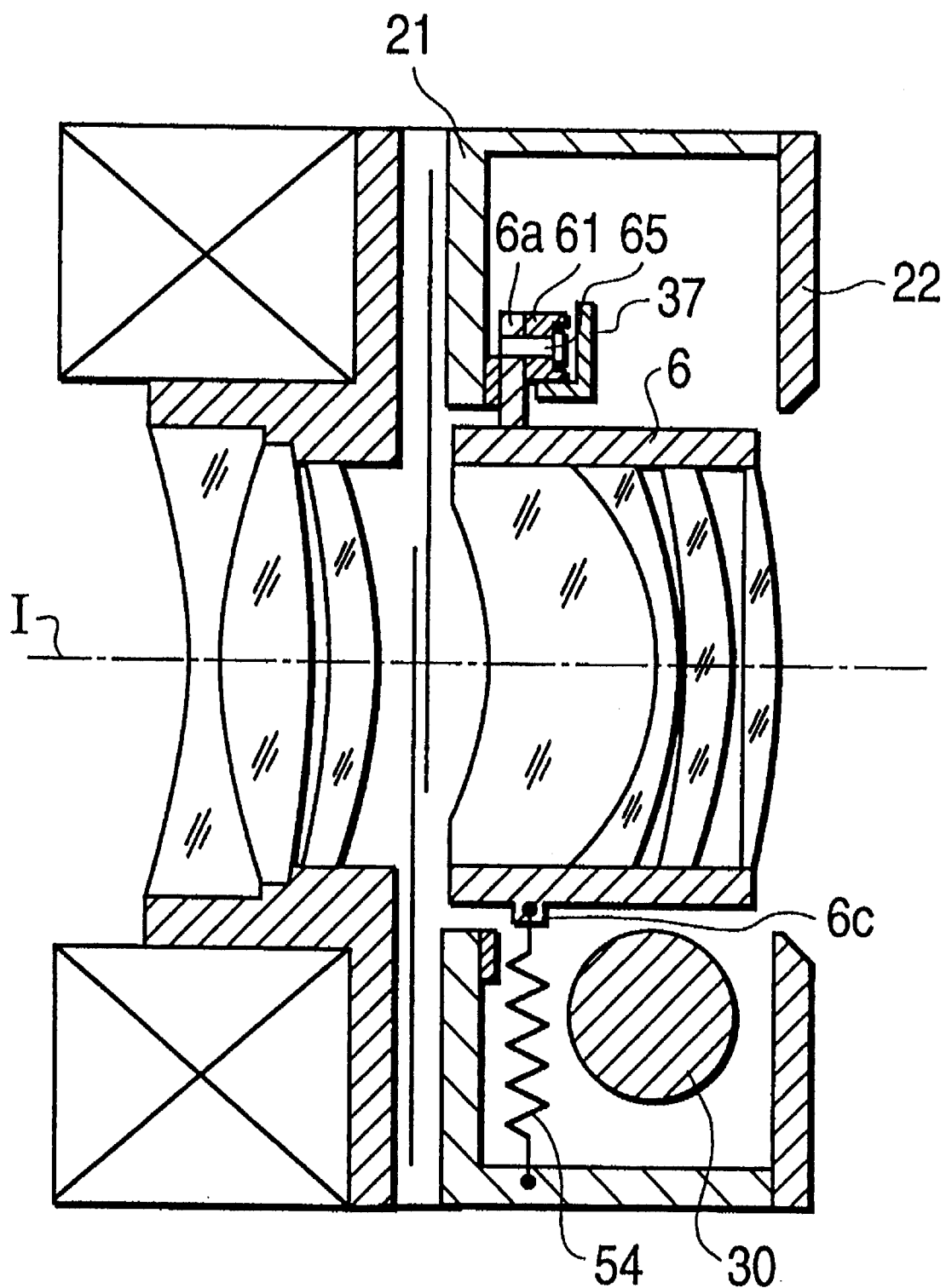
FIG. 3 is a cross-sectional diagram of the vibration-preventing device of FIG. 1 taken along the III—III line in FIG. 1 in accordance with the first embodiment of the present invention.

An x-axis moving member 36 and a y-axis moving member 37 are attached to respective shafts 34 and 35. The x-axis moving member 36 includes a female screw 36a which is threaded into a male screw 34a of shaft 34 to attach the shaft 34 to x-axis moving member 36. Similarly, the y-axis moving member 37 includes a female screw 37a which is threaded into a male screw 35a of shaft 35 to attach the shaft 35 to y-axis moving member 37. Guide members 55 and 56 (FIG. 2) are secured to the moving members 36 and 37, respectively. As seen in FIG. 2, the guide members 55 and 56 are guided by guide shafts 57 and 58, respectively. Guide shaft 57 is secured in parallel with first shaft 34 to bearings 21b and 21c of the base 21. Guide shaft 58 is secured in parallel with second shaft 35 to bearings 21d and 21e of the base 21. The above-described structure allows moving members 36 and 37 to be moved in the x-axis direction and y-axis direction by motors 30 and 31, respectively.

Rollers 59, 60, 61 and 62 are attached to the flange 6a of the lens frame 6 so that the rollers can be freely rotated by roller shafts 63, 64, 65 and 66, respectively. (See, e.g., FIG. 3). A spring 53 is attached to the lens frame 6 opposite rollers 59 and 60, between the base 21 and a spring peg 6b. Similarly, a spring 54 is attached to the lens frame 6 opposite rollers 61 and 62 between the base 21 and a spring peg 6c. The springs 53 and 54 are situated in directions which are approximately the same as the x-axis direction and y-axis direction, respectively, and which are the directions of motion of the respective moving members 36 and 37. (See FIGS. 1 and 3).

Moving members 36 and 37 include joining sections 36b, 36c and 37b, 37c which have a roughly L-shaped cross-section at the front edges of moving members 36 and 37. The rollers 59, 60 are contacted to joining sections 36b and 36c by the energizing force of spring 53, and rollers 61, 62 are contacted to joining sections 37b and 37c by the energizing force of spring 54.

The above-described structure allows the vibration-preventing optical system 8 to be shifted along the direction of motion of moving member 36 (x-axis direction) by motor 30, but to be free in the y-axis direction. In the same manner, the vibration-preventing optical system 8 may be shifted along the direction of motion of moving member 37 (y-axis direction) by y-axis motor 31 but is free in the x-axis direction. The above-described mechanism for driving the vibration-preventing optical system 8 makes it possible to shift the vibration-preventing optical system 8 in all directions inside the opening 21 a of the base 21.

By using springs 53 and 54 to energize the lens frame 6 in directions which are approximately the same as the x-axis direction and the y-axis direction, which correspond to the directions of motion of the moving members 36 and 37, the lens frame 6 and moving members 36 and 37 are always in contact, and thereby the motion of moving members 36 and 37 can be reliably transmitted to the lens frame 6.

Furthermore, through the energizing force of springs 53 and 54, thrust play in shafts 34 and 35, play in the threading section of mate screws 34a and 35a, and play in female screws 36a and 37a can be consistently eliminated in the respective energization directions of the springs 53 and 54. Therefore, the driving force of the respective motors 30 and 31 can be accurately and reliably transmitted to the vibration-preventing optical system 8.

FIG. 5 shows a position and speed detecting device for the vibration-preventing optical system 8 in accordance with the first embodiment of the present invention. The position and speed of the vibration-preventing optical system 8 are determined through the detection of the rotation angles of the motors 30 and 31. As shown in FIGS. 1 and 5, circular plates 40x and 40y, having multiple holes positioned at regular intervals around the perimeter of the circular plates, are positioned so that they move in unison with gears 32a and 33a. Photointerruptors 41x and 41y are attached to the side of the base 21 such that a perimeter section of circular plates 40x and 40y is inserted between respective photointerruptors. The photointerruptors 41x and 41y detect the holes in the sides of circular plates 40x and 40y as pulse signals, and by counting the pulse signal, the detection of the position and the speed of the vibration-preventing optical system 8 is performed.

In accordance with the first embodiment of the invention, the driving force of motors 30 and 31 is transmitted to moving members 36 and 37, respectively, through a screw mechanism; however, other mechanisms can be applied which utilize not only screw mechanisms, but which change rotational movement to straight-line movement, for example, mechanisms which employ cam mechanisms and levers.

Figure 7:
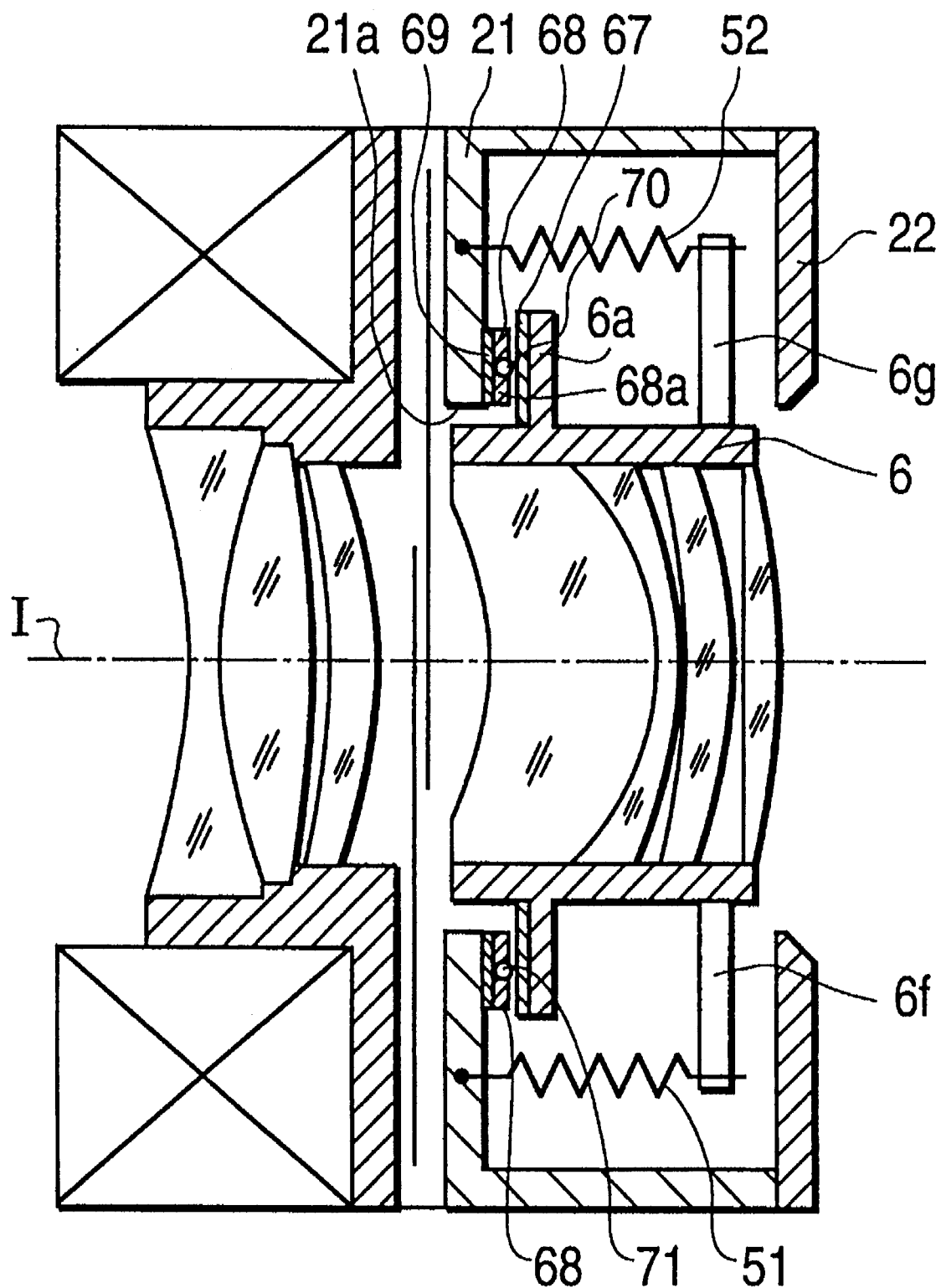
FIG. 7 is a partial cross-sectional diagram of a vibration-preventing device for an optical system in accordance with a second embodiment of the present invention.

FIG. 7 shows a guide which guides the vibration-preventing optical system 8 in a plane which is at a right angle with respect to the optical axis I in accordance with a second embodiment of the present invention. The second embodiment of the invention differs from the first embodiment in that instead of gliding member 50, balls 70, 71 are used to guide the vibration-preventing optical system 8. Like elements in the figures of the first and second embodiments have like reference numerals.

In accordance with the second embodiment, the balls 70, 71 are preferably made of steel. The bails are secured by a structure surrounding the opening 21a of the base 21. The structure for securing the balls 70, 71 includes a first carrier member 67, comprised of a material with high-hardness such as hardened steel, which is secured to flange 6a and is always in contact with bails 70, 71. A second carrier member 69 is positioned on base 21 for carrying balls 70 and 71 and a retainer member 68 is secured to the second carrier member 69 for positioning of balls 70 and 71. The retainer member 68 and the carrier member 69 comprise materials with low-friction characteristics such as teflon, fluororesins, and a phosphor bronze or are made of material which has undergone surface treatment to acquire low-friction characteristics.

The bails 70 and 71 pass through holes 68a and 68b on the retainer member 68 so that they can freely rotate. The lens frame 6 is attached to the base 21 by springs 51 and 52 which attach to arms 6f and 6g, respectively, which are part of the lens frame 6. The lens frame 6 is configured in such a way that the first carrier member 67 is always in contact with bails 70 and 71.

Figure 8:
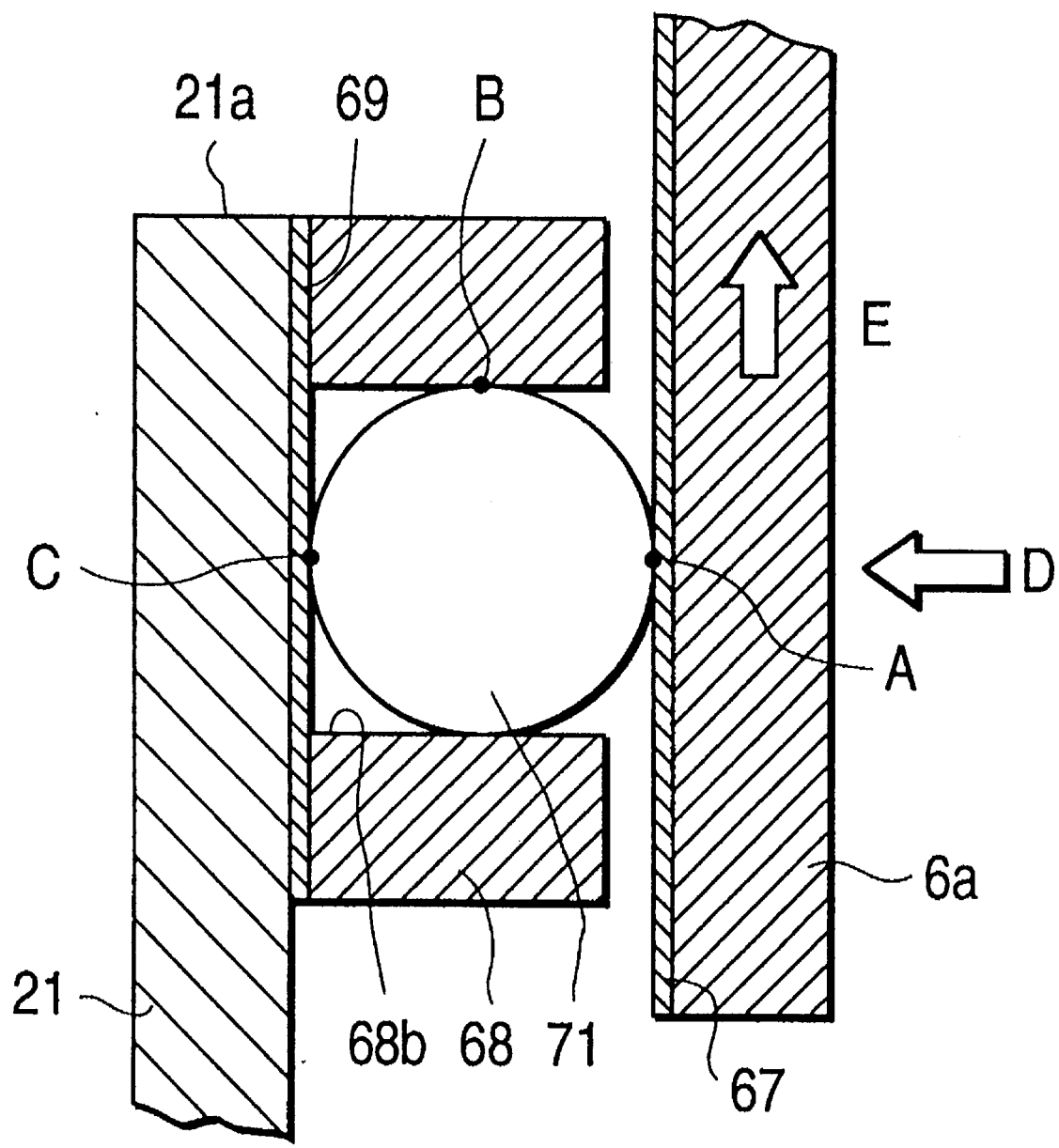
FIG. 8 is an enlarged view of the major pans of a guide mechanism for the vibration-preventing device in accordance with the second embodiment of the present invention.

FIG. 8 is an enlargement of the structure shown in FIG. 7 wherein balls 70, 71 are used instead of gliding member 50. The flange 6a of the lens frame 6 is energized in the direction of arrow D by springs 51 and 52, such that ball 71 is always in contact at point A and point C of carrier members 67 and 69, respectively.

When the lens frame 6 is moved in the direction of arrow E, ball 71 is initially in contact with the inner wall of hole 68b of retainer member 68 at point B; however, because friction at the point B and point C contact points is low, ball 71 rotates inside hole 68b of retainer member 68.

In FIG. 7, bails 70 and 71 are shown in only two places, however, multiple bails may be positioned around opening 21a of the base 21. For example, three or four balls may be positioned around opening 21a of base 21. According to the second embodiment, a low load is achieved and reliability and durability are improved by guiding the lens frame 6 using balls 70 and 71.

As explained in detail above, according to the embodiments of the present invention, a lens frame 6 which holds the vibration-preventing optical system 8 is configured such that is in contact with and always follows moving members which are moved in a direction which is approximately at right angles with the optical axis. The construction of the vibration-preventing optical system 8 arid drive mechanism described above makes it possible to accurately and reliably transmit a driving force from a drive to the vibration-preventing optical system 8 and to achieve a vibration-preventing device which is accurate and simple in structure.

Furthermore, the embodiments of the present invention provide a guide device which guides the lens frame in low-load condition on a plane which is at a right angle with respect to the optical axis, and the lens frame is energized by an energization device, resulting in driving of the vibration-preventing optical system 8 at low load. The vibration-preventing device reliably guides the vibration-preventing optical system, and despite its simple structure, there is no toppling of the vibration-preventing optical system which would adversely affect optical performance.

Although preferred embodiments of the invention have been shown and described, it will be appreciated by those skilled in the art that changes may be made in these embodiments without departing from the principles and spirit of the invention, the scope of which is defined in the claims and their equivalents.

What is claimed is:

1. A vibration-preventing device for use with an optical system, the device, comprising:

an optical system having an optical axis;

a base member to which said optical system is secured:

a moving member in contact with said optical system;

a drive to drive said moving member to shift the optical system in a direction in a plane which is approximately at a right angle to said optical axis; and an energization device, connected to said optical system and to said base member, which energizes said optical system to contact said moving member.

2. A vibration-preventing device as recited in claim 1, wherein said optical system includes a frame and said energization device energizes said frame to contact said moving member.

3. A vibration-preventing device as recited in claim 2, wherein said energization device energizes said frame in approximately the same direction as a direction of motion of said moving member.

4. A vibration-preventing device as recited in claim 3, wherein said moving member comprises a first moving member and a second moving member, and said energization device comprises a first spring and a second spring, and said first spring is attached to said frame opposite said first moving member and said second spring is attached to said frame opposite said second moving member.

5. A vibration-preventing device as recited in claim 2, wherein said moving member further comprises a joining member contacting said frame to allow said frame to move in a direction other than a direction of motion of said moving member.

6. A vibration-preventing device as recited in claim 1, further comprising a guide which determines a direction of motion of said moving member.

7. A vibration-preventing device as recited in claim 1, wherein said optical system includes an optical axis and said moving member includes a first moving member and a second moving member and said drive drives said first moving member and said second moving member in a plane which is approximately at a right angle to said optical axis.

8. A vibration-preventing device for use with an optical system, the device comprising:

a lens system having an optical axis;

a lens frame which holds said lens system;

a guide which guides said lens frame in a plane approximately at a right angle with respect to said optical axis; and an energization device which energizes said lens frame in a direction of said optical axis such that it is always in contact with said guide.

9. A vibration-preventing device as recited in claim 8, wherein said guide includes a spherical member positioned on a plane which is at a right angle with respect to said optical axis, and said vibration-preventing device further comprises a positioning member determining a position of said spherical member, and said positioning member freely supports said spherical member allowing said spherical member to rotate and maintain its position.

10. A vibration-preventing device as recited in claim 9, wherein said positioning member includes a lower hole section which includes material with low-friction characteristics.

11. A vibration-preventing device as recited in claim 8, wherein said positioning member is approximately cylindrical and includes a lower section having planar holes, wherein a position of said spherical member is determined by said planar holes.

12. A vibration-preventing optical system as recited in claim 8, wherein said energization device includes a spring which is attached to said lens frame approximately in a direction of said optical axis.

13. A camera, comprising:

a picture-taking lens system having plural lens groups;

a base member to which said optical system is secured;

a vibration-preventing lens system which is part of said picture-taking lens system, said vibration-preventing lens system being movable approximately in a direction perpendicular to an optical axis of said picture-taking lens system;

a moving member contacting said vibration-preventing lens system;

a drive to drive said moving member to shift the vibration-preventing lens system is any direction in plane approximately at a right angle to said optical axis; and an energization device, connected to said vibration-preventing lens system and to said base member, which energizes said vibration-preventing lens system to contact said moving member.

14. A vibration-preventing device for use with an optical system, comprising:

an optical system having an optical axis;

a moving member in contact with said optical system;

a drive to drive said moving member; and an energization device, connected to said optical system, to energize said optical system to contact with said moving member during drive of said moving member, wherein said moving member includes a first moving member and a second moving member and said drive drives said first moving member and said second moving member in a plane which is approximately at a right angle to said optical axis.

15. A vibration-preventing device as recited in claim 14, wherein said optical system includes a frame and said energization device energizes said frame to contact said moving member.

16. A vibration-preventing device as recited in claim 15, wherein said energization device energizes said frame in approximately the same direction as a direction of motion of said moving member.

17. A vibration-preventing device as recited in claim 15, wherein said moving member further comprises a joining member contacting said frame to allow said frame to move in a direction other than a direction of motion of said moving member.

18. A vibration-preventing device as recited in claim 14, further comprising a guide Which determines a direction of motion of said moving member.

19. A vibration-preventing device for use with a optical system, comprising:

an optical system;

a moving member in contact with said optical system;

a drive to drive said moving member; and an energization device, connected to said optical system, to energize said optical system to contact said moving member during drive of said moving member, wherein said energization device includes a first spring and a second spring, and said first spring and said second spring are attached to said optical system opposite said moving member.

20. A vibration-preventing device as recited in claim 19, wherein said optical system includes a frame and said energization device energizes said frame to contact said moving member.

21. A vibration-preventing device as recited in claim 20, wherein said energization device energizes said frame in approximately the same direction as a direction of motion of said moving member.

22. A vibration-preventing device as recited in claim 20, wherein said moving member further comprises a joining member contacting said frame to allow said frame to move in a direction other than a direction of motion of said moving member.

23. A vibration-preventing device as recited in claim 19, further comprising a guide which determines a direction of motion of said moving member.

24. A vibration-preventing device for use with a optical system, comprising:

an optical system having an optical axis;

a moving member in contact with said optical system, said moving member including a first moving member and a second moving member;

a drive to drive said first and second moving members in a plane approximately at a right angle to the optical axis; and an energization device, connected to said optical system, which energizes said optical system to contact said moving member, said energization device including a first spring and a second spring, said first spring being attached to said optical system opposite said first moving member and said second spring being attached to said optical system opposite said second moving member.

25. A vibration-preventing device as recited in claim 24, wherein said optical system includes a frame, and said first spring is attached to said frame opposite said first moving member and said second spring is attached to said frame opposite said second moving member.

26. A vibration-preventing device as recited in claim 25, wherein said energization device energizes said frame in approximately the same direction as a direction of motion of said moving member.

27. A vibration-preventing device as recited in claim 25, wherein said moving member further comprises a joining member contacting said frame to allow said frame to move in a direction other than a direction of motion of said moving member.

28. A camera having a vibration-preventing device for a camera optical system, comprising:

a lens system having an optical axis;

a lens frame to hold said lens system;

a moving member to contact said lens frame;

a drive to drive said moving member;

a guide to guide said lens frame in a plane approximately at a right angle with respect to said optical axis;

a first energization device, connected to said lens frame, which energizes said lens frame to contact said moving member; and a second energization device to energize said lens frame in a direction of said optical axis so that said lens frame is always in contact with said guide.

* * * * *